(12) United States Patent
Lennen

(10) Patent No.: US 8,184,676 B2
(45) Date of Patent: May 22, 2012

(54) METHOD AND APPARATUS FOR MITIGATING THE EFFECTS OF CW INTERFERENCE VIA POST CORRELATION PROCESSING IN A GPS RECEIVER

(75) Inventor: Gary Lennen, Cupertino, CA (US)

(73) Assignee: CSR Technology Inc., San Jose, CA (US)

( * ) Notice: Subject to any disclaimer, the term of this patent is extended or adjusted under 35 U.S.C. 154(b) by 685 days.

(21) Appl. No.: 12/341,584

(22) Filed: Dec. 22, 2008

(65) Prior Publication Data

US 2009/0323780 A1 Dec. 31, 2009

Related U.S. Application Data

(60) Provisional application No. 61/076,602, filed on Jun. 27, 2008.

(51) Int. Cl.
*H04B 1/00* (2006.01)

(52) U.S. Cl. ........................................ 375/148

(58) Field of Classification Search .......... 375/136–137, 375/142–145, 147–152, 316, 340, 342–343, 375/346, 378, 14, 325, 348
See application file for complete search history.

(56) References Cited

U.S. PATENT DOCUMENTS

| | | | | |
|---|---|---|---|---|
| 6,118,808 | A * | 9/2000 | Tiemann et al. | 375/142 |
| 6,282,231 | B1 * | 8/2001 | Norman et al. | 375/144 |
| 7,453,961 | B1 * | 11/2008 | Li et al. | 375/343 |
| 7,680,178 | B2 * | 3/2010 | Raman et al. | 375/150 |
| 7,756,085 | B2 * | 7/2010 | Terasawa et al. | 370/335 |
| 7,822,105 | B2 * | 10/2010 | Underbrink et al. | 375/148 |
| 7,864,832 | B2 * | 1/2011 | Pisek et al. | 375/140 |

FOREIGN PATENT DOCUMENTS

WO WO 2005/047923 * 5/2011

* cited by examiner

*Primary Examiner* — Chieh M Fan
*Assistant Examiner* — Sophia Vlahos
(74) *Attorney, Agent, or Firm* — RatnerPrestia

(57) ABSTRACT

A positioning system receiver that mitigates the effect of continuous wave (CW) carrier interference with post correlation processing in a satellite positioning receiver, while not distorting the signal waveform or degrading receiver sensitivity and performing in low signal and dynamic interference environments.

20 Claims, 13 Drawing Sheets

METHOD AND APPARATUS FOR MITIGATING THE EFFECTS OF CW INTERFERENCE VIA POST CORRELATION PROCESSING IN A GPS RECEIVER

CROSS-REFERENCE TO RELATED APPLICATIONS

This application claims priority under 35 U.S.C §119(e) to U.S. Provisional Application Ser. No. 61/076,602, titled "Method and Apparatus for Mitigating the Effects of CW Interference Via Post Correlation Processing in a GPS Receiver," filed on Jun. 27, 2008, all of which is incorporated into this application by reference in its entirety.

BACKGROUND OF THE INVENTION

1. Field of Invention

This invention relates in general to satellite navigation systems and in particular to mitigating the effects of CW interference in Global Positioning System ("GPS") receivers.

2. Related Art

Satellite positioning systems have been deployed that enable receivers to determine their position on or near the Earth. These satellite positioning systems typically have a number of satellite vehicles (SVs) that orbit the earth providing time and other data using spread spectrum approaches, such as CDMA in the GPS system deployed by the United States.

One major advantage of a spread spectrum system, such as a system that includes a GPS receiver, is its ability to reject interference such as wide band interference. This is because correlation of a wide band interference signal with a reference code reduces the power density of the interference and its effect on the signal. However, it is also known that GPS receivers are susceptible to narrowband interference. One common type of narrowband interference is continuous wave carrier (CW) interference. In fact, the narrower the bandwidth of the interference signal the less is the ability of the receiver to reject it, resulting in degraded performance such as reduced receiver sensitivity.

Past methods of suppressing narrowband interference have included hardware detection and mitigation of interference in the frequency domain or in the time domain. However, hardware interference suppression methods introduce increased hardware complexity and cost, and may degrade receiver sensitivity when no interference signal is present or may suffer from poor performance in a dynamic interference environment.

Therefore, there is a need for a system and a method capable of mitigating the effects of CW Interference via post correlation processing in a GPS Receiver.

SUMMARY

The present invention mitigates the effect of continuous wave (CW) carrier interference with post correlation processing in a satellite positioning receiver, such as a GPS receiver. The mitigation does not distort the signal waveform or degrade receiver sensitivity, introduces no hardware complexity, and gives good performance in low signal and dynamic interference environments. The approach to mitigating the effects of CW interference operates on the correlation corresponding to the punctual code phase and the adjacent offset code phase to detect the CW interference. The approach then estimates the phase, frequency, and amplitude of the detected CW and subtracts the estimated CW from the coherent integration.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The invention can be better understood with reference to the following figures. The components in the figures are not necessarily to scale, emphasis instead being placed upon illustrating the principles of the invention. In the figures, like reference numerals designate corresponding parts throughout the different views.

DETAILED DESCRIPTION

In the following description of the preferred embodiment, reference is made to the accompanying drawings that form a part hereof, and in which is shown by way of illustration a specific embodiment in which the invention may be practiced. It is to be understood that other embodiments may be utilized and structural changes may be made without departing from the scope of this invention.

In the following description of examples of implementations, reference is made to the accompanying drawings that form a part hereof, and which show, by way of illustration, specific implementations of the invention that may be utilized. Other implementations may be utilized and structural changes may be made without departing from the scope of the present invention.

The present disclosure describes an implemented post correlation CW interference detection and reduction approach. It does not distort the signal waveform or degrade receiver sensitivity, introduces no hardware complexity, and gives good performance in low signal and dynamic interference environments.

Described herein is an approach for detecting and mitigating CW interference in the correlation domain. The method may be implemented in software. The method operates on the correlation corresponding to the punctual code phase and the adjacent offset code phase to detect the CW. The method then estimates the phase, frequency, and amplitude of the detected CW and subtracts the estimated CW from the coherent integration.

Figure 1:
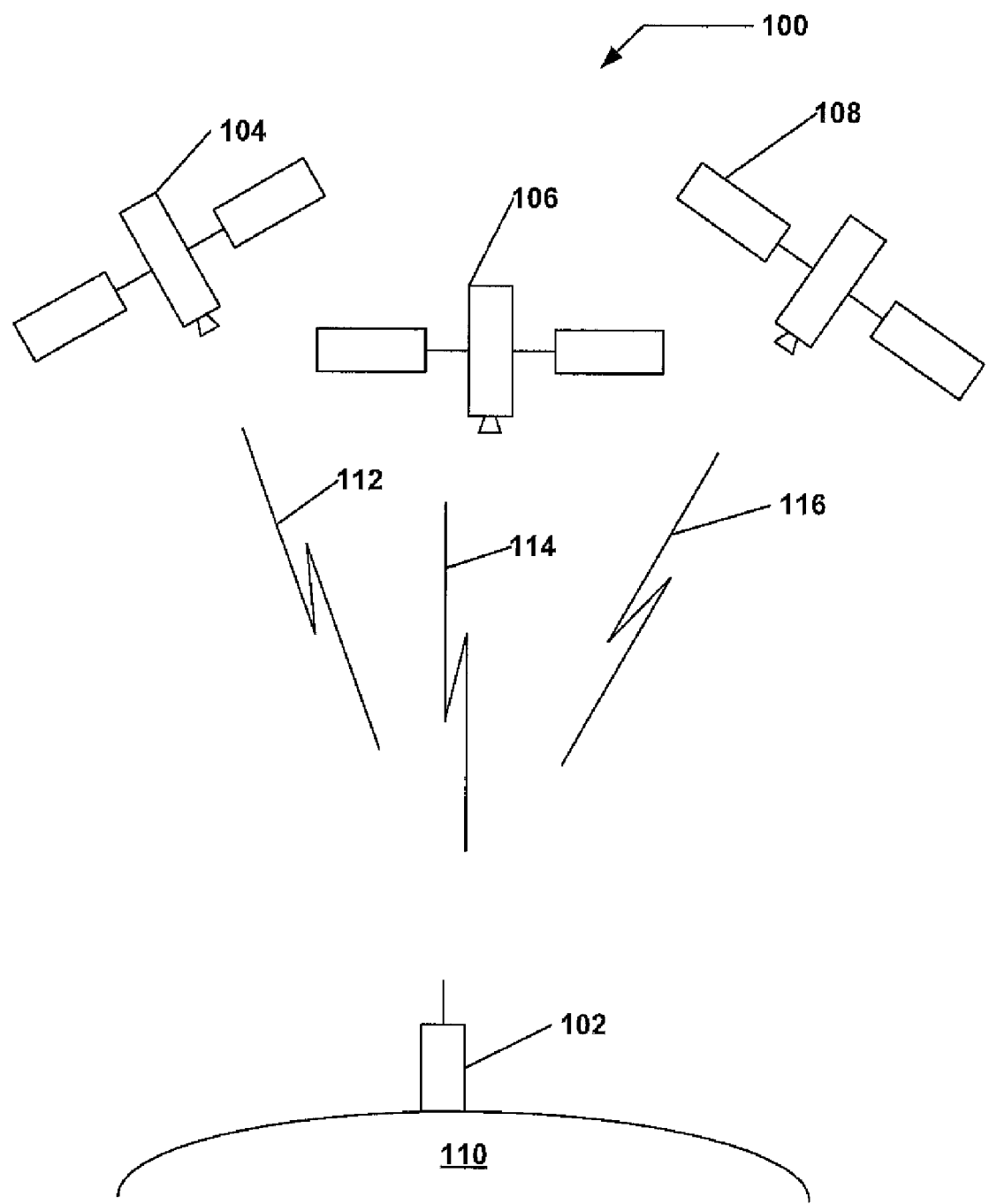
FIG. 1 is an illustration of a satellite positioning system with satellite vehicles (SVs) and a satellite positioning system receiver that has an example implementation of the invention.

FIG. 1 is an illustration of a satellite positioning system 100 with a satellite positioning system receiver 102 that has an example implementation of the inventions that mitigates the effects of continuous wave (CW) carrier interference and positioning system SVs 104, 106 and 108. The satellite positioning system receiver 102 may commonly be referred to as a Global Positioning System (GPS) receiver. But in practice the GPS receiver may be any type of position system receiver, including a Galileo receiver and a Global Orbiting Navigation Satellite System (GLONASS) receiver. The SVs 104, 106 and 108 transmit spread spectrum CDMA encoded positioning signals 112, 114 and 116, respectively, to the GPS receiver 102 located on or near the earth 110. Typically at least two spread spectrum CDMA encoded positioning signals plus accurate time or another spread spectrum CDMA encoded positioning signal may be used to determine the position of the GPS receiver 102 on the earth 110.

Figure 2:
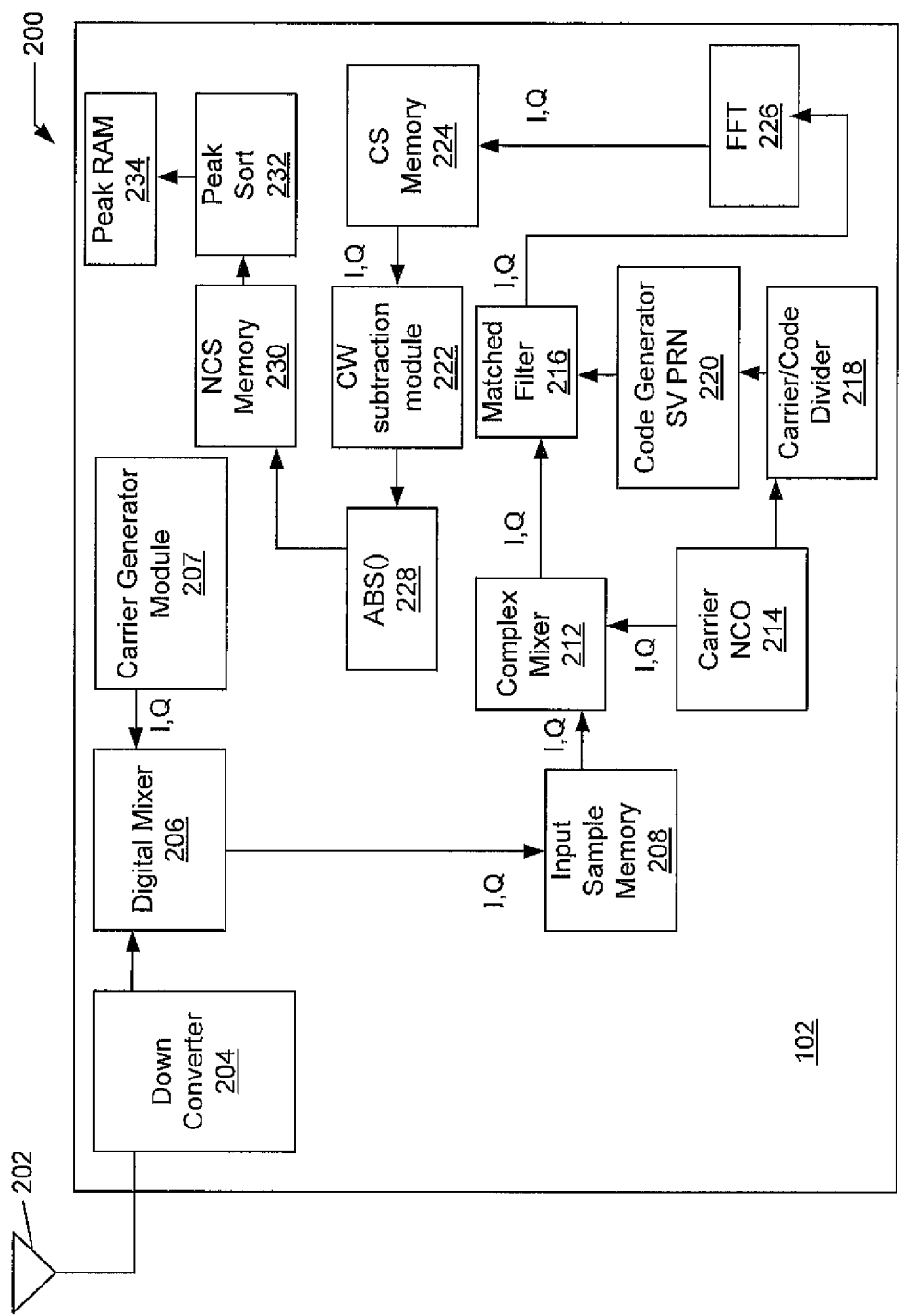
FIG. 2 is a block diagram of the example implementation of the SV positioning system receiver of FIG. 1.

FIG. 2 is a block diagram of the example implementation 200 of the satellite positioning system receiver (commonly referred to as a GPS receiver) 102 of FIG. 1. Positioning signals from the SVs 104, 106 and 108 may be received at the GPS receiver 102 via antenna 202. The positioning signals are down converted to an intermediate frequency (IF) and digitally sampled in the down converter and sampler module 204. The IF samples are then digitally mixed by digital mixer 206 with a generated carrier signal from the carrier generator module 207. The resulting I and Q signal data may be stored in an input sample memory 208. The digital samples are then mixed by a complex mixer 212 with an I and Q signal from a carrier numerical controlled oscillator 214 resulting in a baseband signal.

The resulting baseband signal samples may be processed by matched filter 216. The carrier NCO 214 may provide a carrier offset to a carrier/code divider 218 depending on the type of GPS signals being received (GPS, Galileo, etc. . . . ). The code generator 220 generates a pseudo-random number (PRN) associated with a spread spectrum CDMA signal from one of the SVs. The generated PRN is then used by the matched filter 216 to process the resulting signal samples. The matched digital signal samples (I and Q) may be processed by the FFT 226 with the resulting I and Q data stored in CS memory 224. The CW subtraction module 222 may be triggered by detection of CW interference and results in CW interference being subtracted or removed from the I and Q data.

The CW subtraction module 222 may be positioned after the CS memory 224. This is possible because the CW subtraction module 222 operates on the coherently summed I and Q values. In general the output of the matched filter 216 may be further coherently summed successively into the CS memory 224; therefore, if coherent integration occurs for 100 msecs, then 100×1 msec matched filter outputs will be summed into the CS memory. In this implementation, the CS memory 224 contains the values needed to be operated on by CW subtraction module 222 at the end of the 100 msec period. Alternatively, the CW subtraction module 222 may be placed at the output of the FFT 226 module because this module performs further coherent integration, before the abs( ) 228 block.

The resulting data samples may then have an absolute value function 228 applied. The resulting values are then stored in a non-coherent sample (NCS) memory 230. A peak sort 232 may then be applied with the peaks stored in peak memory or peak RAM 234. The peaks indicate where the strongest matches occurred between the PRN and digital signal samples that have had the strong SVs signals removed. Once a sufficient number of SVs are acquired and tracked, a position may be determined using the data associated with the SVs.

Figure 3:
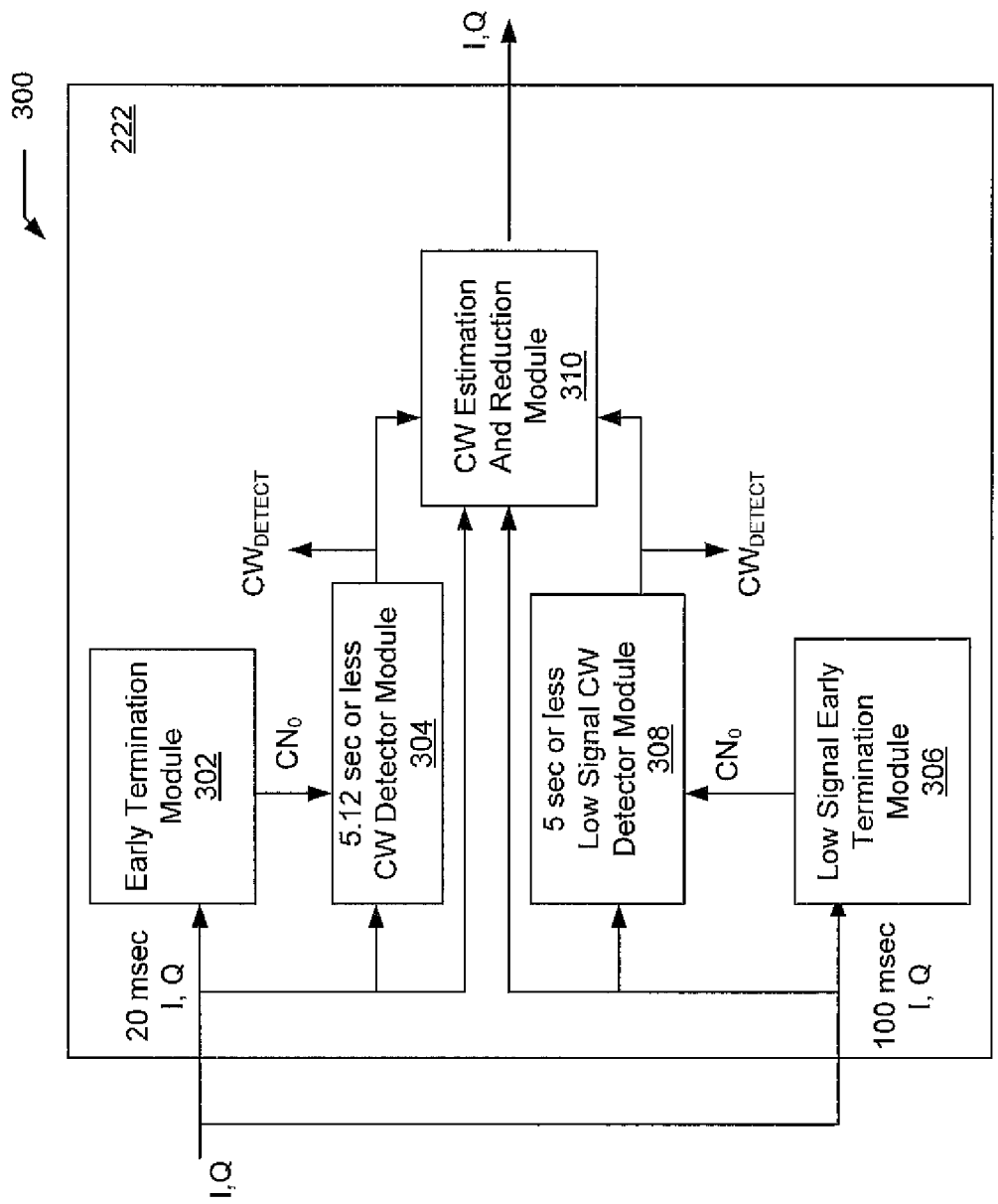
FIG. 3 is a block diagram of an example of the CW subtraction module of FIG. 2 in accordance with one embodiment of the invention.

FIG. 3 is a block diagram of an example of the CW subtraction module of FIG. 2 in accordance with one embodiment of the invention. The GPS tracking channel hardware may provide the 20 msec I and Q coherent integration for the punctual code phase and the adjacent offset code phase. The detector that is formed via the punctual code phase to adjacent offset code phase ratio is essentially a code offset energy detector; in other words, under no interference conditions the offset energy may be essentially set by the ambient noise environment level. When a narrowband CW interferer is present, the offset energy will be larger than the ambient noise environment level. The early termination algorithm is formed between the punctual correlation and the noise channel (a noise channel is usually formed separately from a regular channel and uses a non-standard C/A code, one that the SVs will never transmit). The early termination module does not use offset correlations. The early termination module essentially is a measure of when it is acceptable to make a decision, in this case a decision about the presence of narrowband CW interference.

The 20 msec coherent integration values are non-coherently accumulated for the punctual and adjacent offset code phase and their ratio taken by the early termination module 302 to calculate (i.e., detect) the minimum or lowest signal to noise power (CNo) present. The CNo is provided to the CW detector module 304 to set the CW detection threshold (the CW detection threshold ratio may be determined via simulation between 1.95-1.09 for 0.16-8.16 secs) as a test for the presence of the CW interference. The CW detector module 304 may also performs a non-coherent integration of the 20 msec coherent integration value for different periods up to 5.12 seconds.

CW interference is identified when the non-coherent integration of the offset code phase multiplied by the CW detection threshold exceeds the non-coherent integration of the punctual code phase. The 20 msec coherent integration and the 5.12 seconds non-coherent integration are chosen as exemplary periods for purposes of illustration and description. Many other coherent and non-coherent periods are also possible.

Alternatively, for detection of CW under very low signal conditions ($\leqq$−160 dbm) the GPS tracking channel hardware may provide 100 msec coherent integration with data aiding.

The 100 msec coherent integration values may be non-coherently accumulated for the punctual and adjacent offset code phases and their ratio taken by the Low Signal Early Termination module 306 to determine the minimum signal to noise power (CNo) present. The CNo is similarly provided to the low signal CW detector module 308 to set the CW detection threshold to determine the presence of CW interference. The low signal CW detector module 308 then performs non-coherent integration of the 100 msec coherent integration value for different periods up to 5 sec in the current implementation. CW interference is similarly detected when the non-coherent integration of the adjacent offset code phase multiplied by a detect threshold exceeds the non-coherent integration of the punctual code phase.

The punctual code phase may be determined by the peak tracking point of the code phase tracking loop. In general, the code tracking loop takes early and late correlations (for example ¼ chip apart) and forms a loop to balance the early and late correlations (coherent or non-coherent) in terms of power. When the two correlations are balanced the peak power is half way between the two correlations (early and late), and this is the peak signal energy in the system (maximum CNo).

Again, the 100 msec coherent integration (equal to 5 seconds=50×100 msec periods) and the greater than 5 seconds of non-coherent integration may be chosen as exemplary periods for purposes of illustration and description. Many other coherent and non-coherent periods are also possible.

Either CW detector modules 304 or 308 may trigger the operation of the CW estimation and reduction module 310. The CW estimation and reduction module operates on the 20 msec or the 100 msec coherent integration values of a window of code phase around the punctual code phase. The window of code phase is a sliding sum of the last N 20 or 100 msec non-coherent sums (e.g., the last 50 100 msecs non-coherent values or the last 256 20 msec values (5.12 seconds)). The CW estimation and reduction module 310 estimates the phase, frequency, and amplitude of the detected CW interference from the periodic waveform in the correlation domain.

The CW estimation and reduction module 310 then reconstructs the CW values for the different code phase taps and subtracts them from the I, Q coherent integration measurements to be passed on for further processing to achieve a navigation solution. The taps are initially generated in the matched filter; each tap is further integrated in the coherent and non-coherent accumulations. The code phases chosen for CW estimation are preferably ≧1 chip from the estimated signal peak because correlations ≦1 chip away from the signal peak contain signal power and will distort the estimate of the CW. For operation in large multi-path delay environments an even greater delay may be used; for example, choosing correlations ≧3 code chips from the estimated signal peak correlation.

Figure 4:
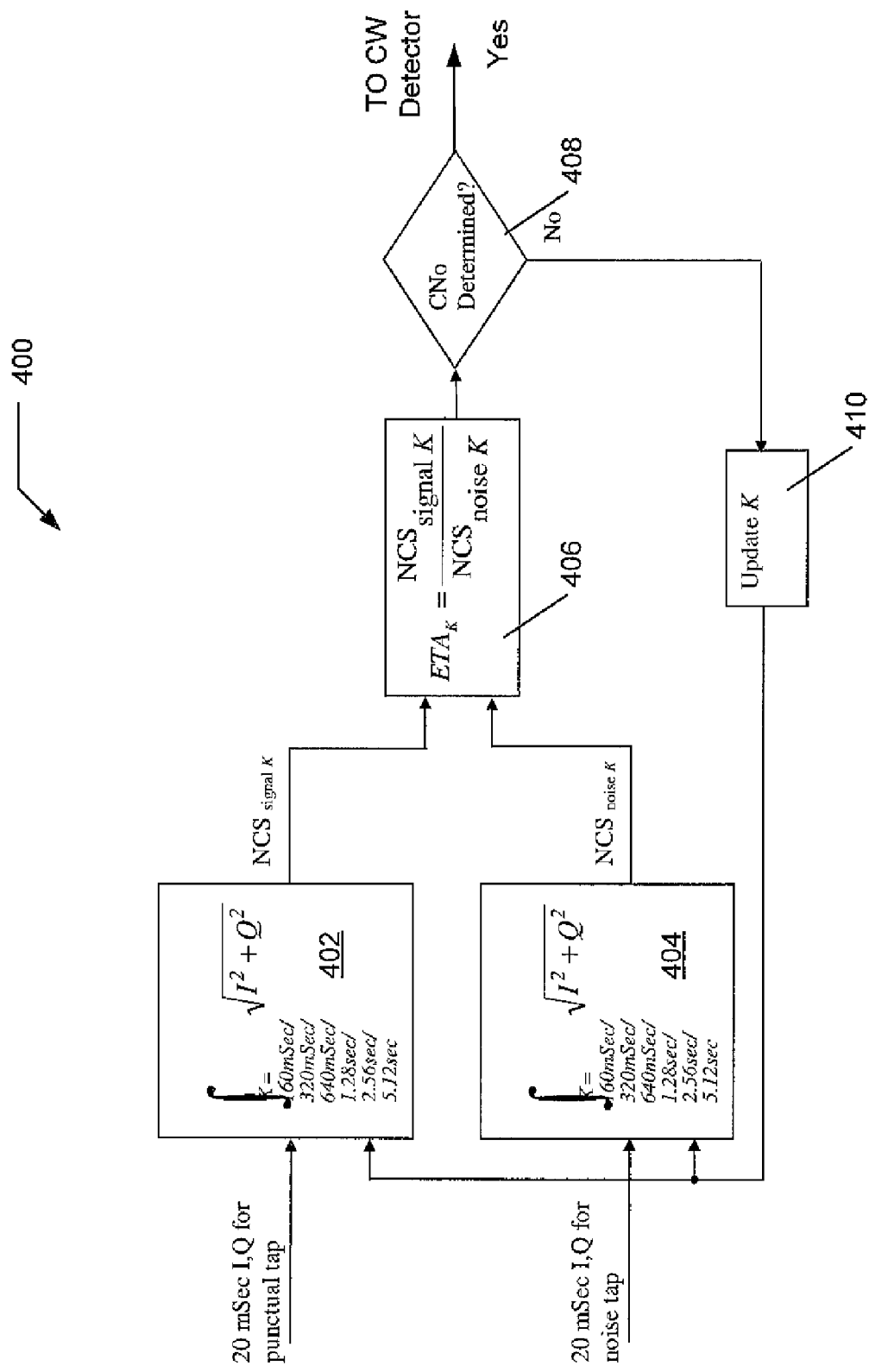
FIG. 4 is a block diagram 400 that illustrates an embodiment of the early termination approach employed by the early termination module 302 of FIG. 3 in accordance with an embodiment the invention.

FIG. 4 is a block diagram 400 that illustrates an embodiment of the early termination approach (ETA) employed by the early termination module 302 of FIG. 3 in accordance with an embodiment of the invention. The ETA is intended to provide an indication of the minimum CNo present with a high degree of certainty so that the detection threshold for the CW detector module 302 of FIG. 3 may be set appropriately.

The ETA 402 is computed as the ratio of the punctual signal power to the noise channel power as follows:

$$ETA_K = \frac{NCS_{signalK}}{NCS_{noiseK}}, \quad \text{(Eq. 1)}$$

where $ETA_K$ is the ETA output at time K; $NCS_{signal\ K}$ is defined as the non-coherent integration of the 20 msec I, Q coherent integration values for the punctual tap over period K, and $NCS_{noise\ K}$ 402 is defined as the non-coherent integration of the 20 msec I, Q for the noise channel across approximately the same period K. The non-coherent integration period K is set to be either 160 msec, 320 msec, 640 msec, 1.28 sec, 2.56 sec, or 5.12 sec. Non-coherent integration over period K is carried out by taking the square root of the sum of the square of the 20 msec coherent integration values of I and Q or using an approximation and integrating it over the selected K period. $ETA_K$ is used as an input to estimate the CNo using a function that represents the relationship between CNo and $ETA_K$ for the selected integration period K.

Figure 5:
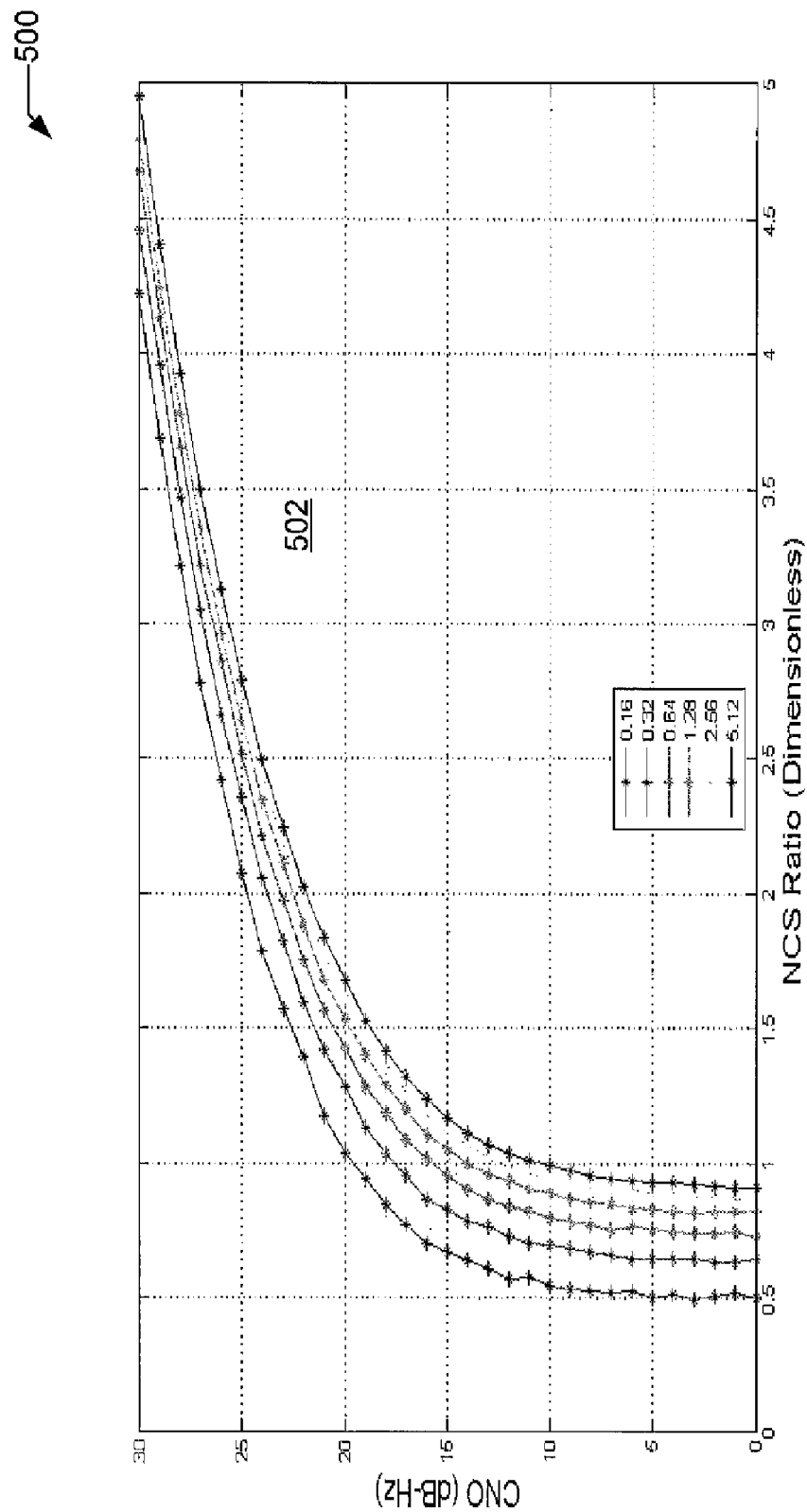
FIG. 5 is a plot showing a simulated relationship between $ETM_k$ ratio and CNo.

FIG. 5 is a chart 500 of a representative plot of simulation results 502 showing how the CNo is related to $ETA_K$ 406 of FIG. 4 for all the possible K. It is to be interpreted as the $ETA_K$ ratio that gives the CNo with 99.9% probability or greater. Given a calculated $ETA_K$ 402 from the ETM 302, FIG. 3, is used to estimate the CNo.

The operation of the ETA can be demonstrated as follows. Suppose initially a K of 160 msec is chosen as the non coherent integration period. As seen from FIG. 5, it is desirable to operate on the flatter portion of the curve for the CNo estimate because a slight perturbation of the $ETA_K$ is less likely to lead to a large error in the CNo estimate. It is also seen that as the non-coherent integration period K is increased, the $ETA_K$ will increase for a given CNo, suggesting that larger K should be used to estimate a smaller CNo in a weak signal environment.

Therefore, one strategy in estimating CNo may be to start with the smallest K to minimize the time for the ETA. A minimum decision threshold may be established for each K. If the measured $ETA_K$ exceeds this decision threshold then a reliable estimate of the CNo may be made and CNo is determined 408. Otherwise, a new $ETA_K$ measurement should be taken with the next larger K 410 until either $ETA_K$ exceeds the new threshold for the larger K or K has reached the maximum. CNo is measured as a secondary effect only, where the primary thing that is being measured with early termination and subsequent offset energy computation is the joint probability of the early termination and offset energy calculation (narrowband CW interference detection) resulting in a successful decision of interference presence (i.e., present or not).

For example, for $ETA_K$=160 msec, a minimum decision threshold of 2.9 can be established so that a CNo of 27 db-Hz or greater can be reliably detected. If the measured $ETA_K$=160 msec exceeds this threshold, then the CNo can be estimated from the K=0.16 sec curve of FIG. 5. If the measured $ETA_K$=160 msec does not exceed this threshold, then K should be increased to 0.32 sec and a new $ETA_K$=320 msec measurement taken. A new decision threshold for $ETA_K$=320 msec may be established to be 2.5 so that a CNo down to 25 db-Hz or greater can be detected. If the measured $ETA_K$=320 msec exceeds the new threshold, then CNo is between 25 and 27 db-Hz and can be estimated from the K=0.32 sec curve of FIG. 5. Otherwise, K is increased to 0.64 sec and a new decision threshold for $ETA_K$=640 msec corresponding to a lower CNo established. The process is repeated until either CNo can be found or K has reached the maximum of 5.12 sec.

At this point, CNo can be estimated from the K=5.12 sec curve of FIG. 3 even if the measured $ETA_K$=5.12 sec is below the $ETA_K$=5.12 sec decision threshold. Alternatively, longer coherent integration with data aiding can be performed to extend the decision threshold down to lower CNo so that weak signal condition can be more reliably detected.

The 20 msec I, Q coherent integration value for the punctual tap from the GPS Tracking Channel Hardware is synchronized to the 50 bit-per-sec timing of each satellite channel. Therefore, its non-coherent integration $NCS_{signal\ K}$ is also aligned with the bit boundary. Ideally, the 20 msec coherent integration I, Q for the noise channel should also be aligned with the bit boundary of each tracking channel so that the computation of $NCS_{noise\ K}$ 404, FIG. 4, and consequently $ETA_K$ is less susceptible to changes in input noise power caused by automatic gain control (AGC) gain changes, antenna matching, etc.

Alternatively, as a simplification, a global 20 msec noise channel I, Q that is not synchronized to any track channel may be shared between all channels. For example, a global moving window non-coherent integration of 160 msec can be maintained for all the channels. This global $NCS_{noise\ K}$=160 msec represents the non coherent integration of the last eight global 20 msec noise channel I, Q and is updated every 20 msec. Each track channel then maintains its local version of the $NCS_{noise\ K}$=160 msec by using the global value that best synchronizes with the track channel. This local $NCS_{noise\ K}$=160 msec is only updated every 160 msec and is integrated further to generate the $NCS_{noise\ K}$ for K up to 5.12 sec.

The ETA provides the CNo to the CW detector module 302, FIG. 3, for it to set the CW detection threshold to test for the presence of the CW. The CW detector module 302 is described by the following equation:

If $(C_{punctual} < (CW_{threshold} * C_{offset}))$

CW_present_flag=true;

else

Figure 6:
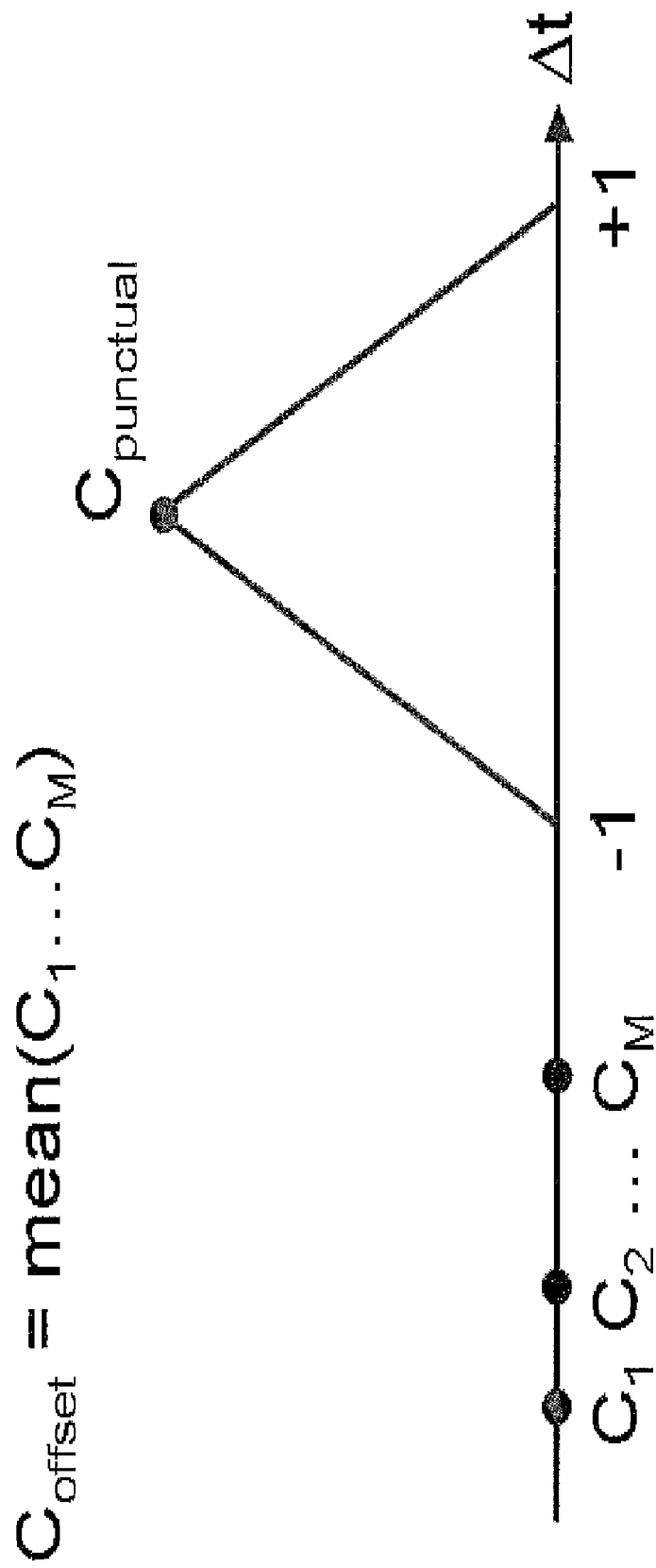
FIG. 6 is a plot showing a construction of $C_{offset}$ from the mean of M correlations.
Figure 7:
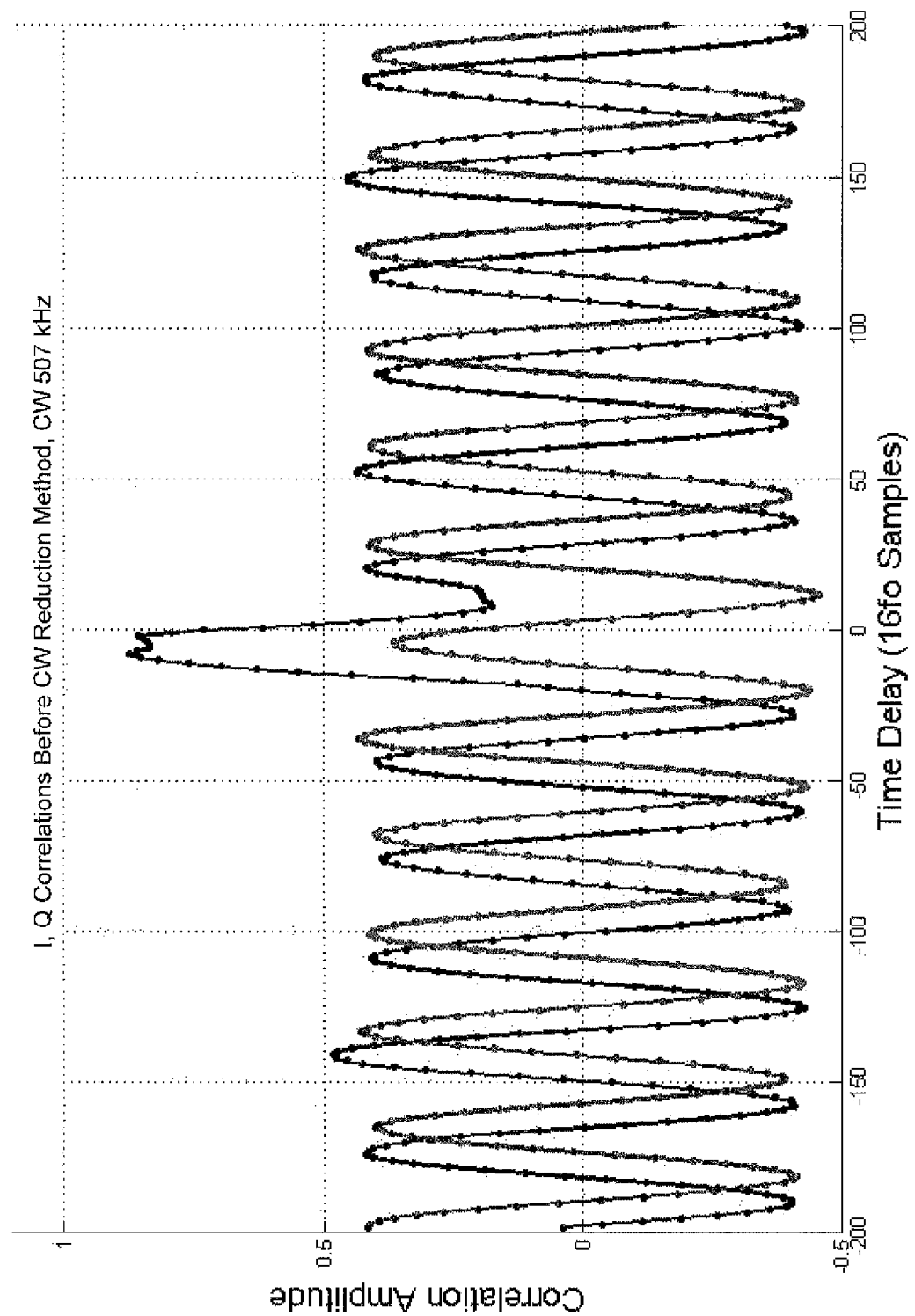
FIG. 7 is a plot showing I/Q correlations before processing under the CW estimation and reduction method with CW 507 kHz.
Figure 8:
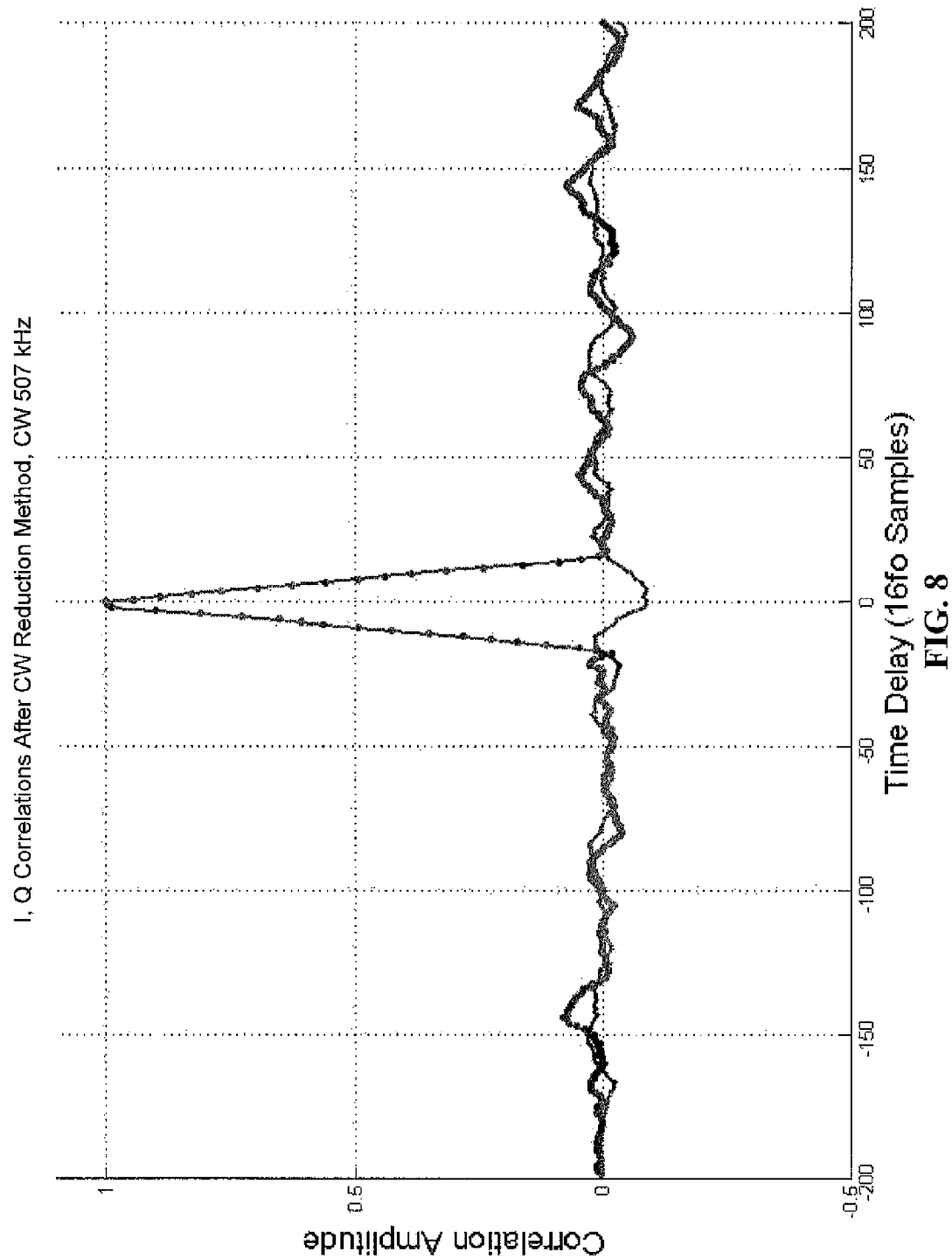
FIG. 8 is a plot showing I/Q correlations after processing under the CW estimation and reduction method with CW 507 kHz.
Figure 9:
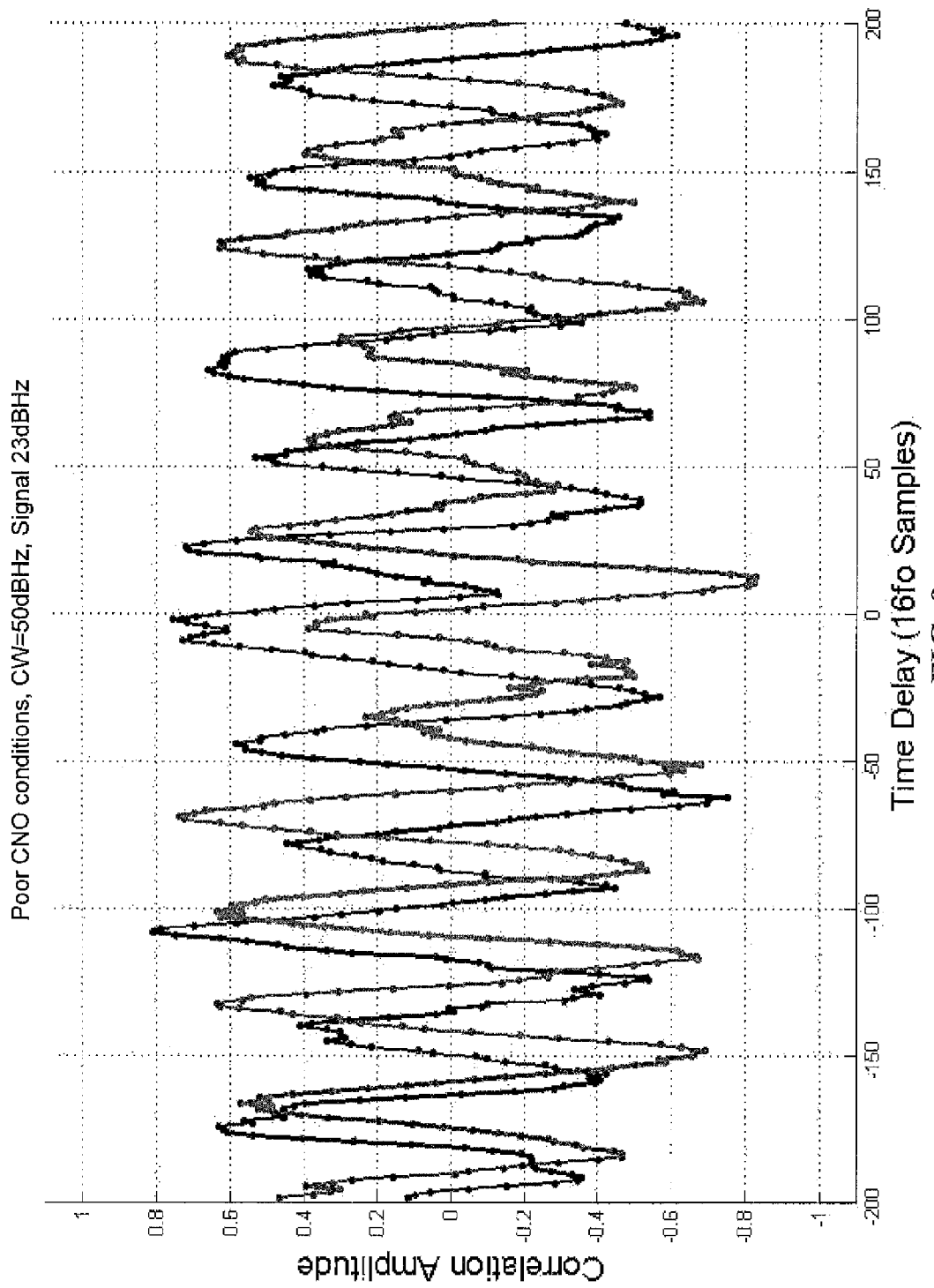
FIG. 9 is a plot showing I/Q correlations under poor $CN_o$ condition before processing under the CW estimation and reduction method.
Figure 10:
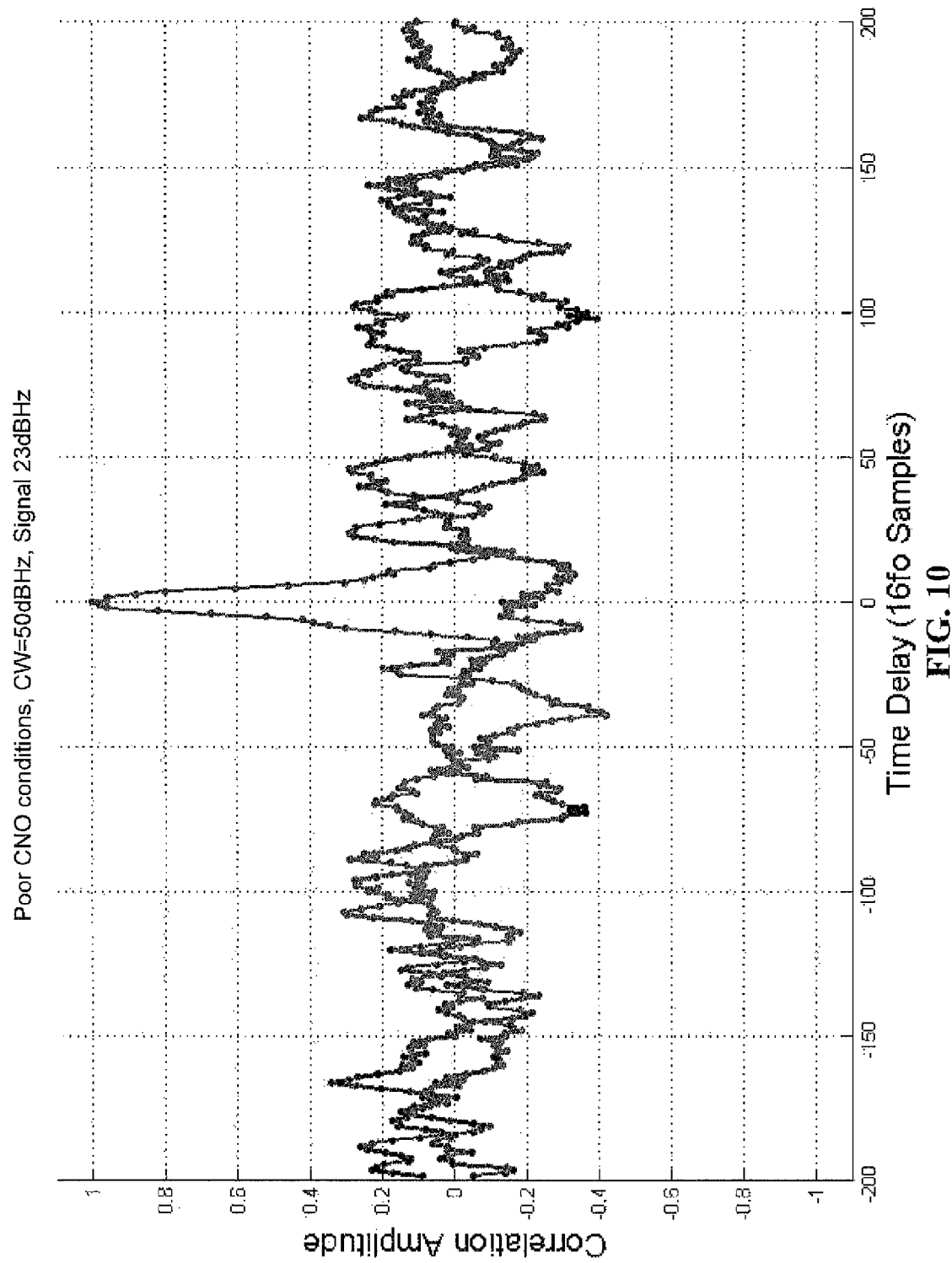
FIG. 10 is a plot showing I/Q correlations under poor $CN_o$ condition after processing under the CW estimation and reduction method.
Figure 11:
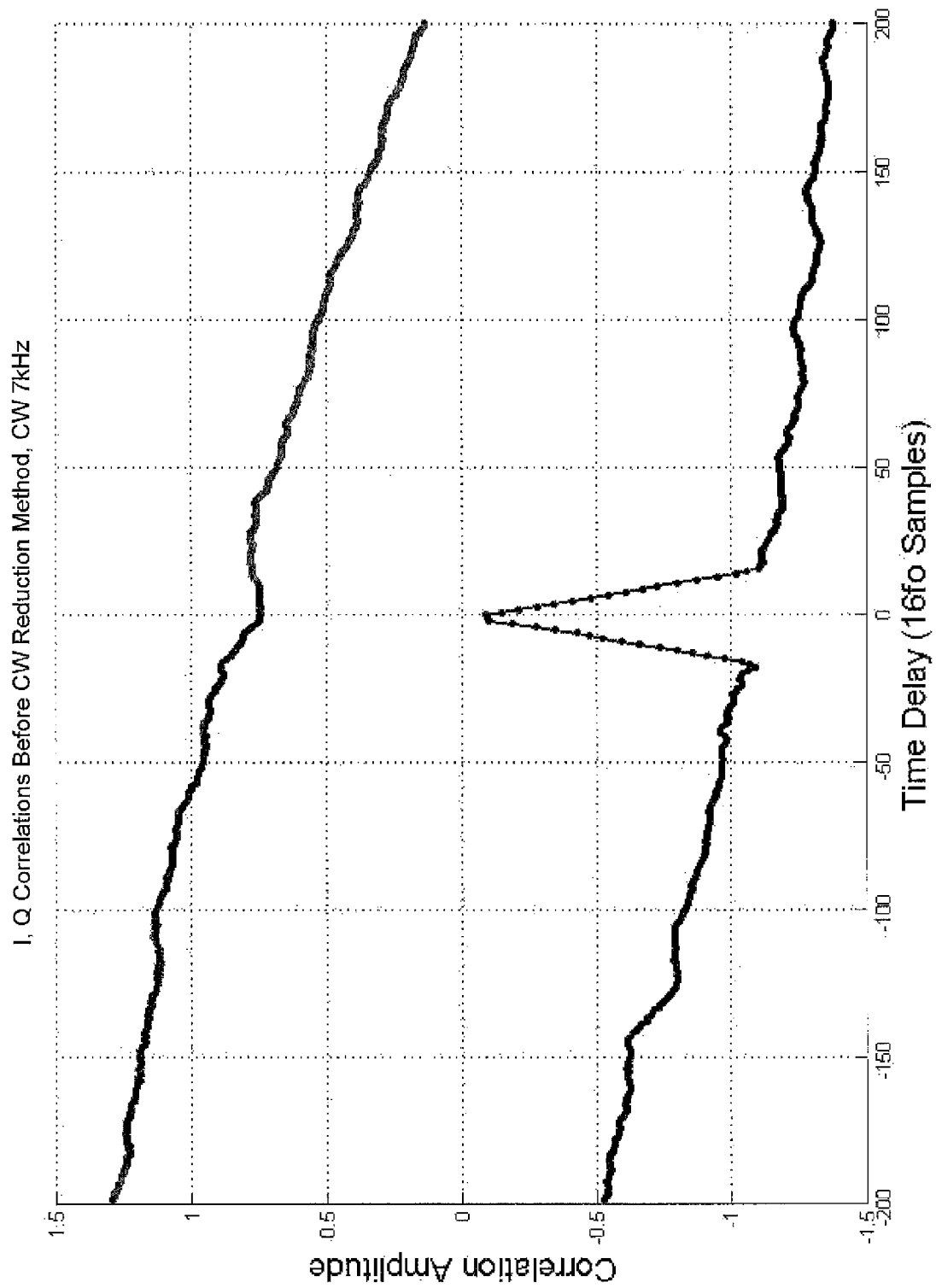
FIG. 11 is a plot showing I/Q correlations before processing under the CW estimation and reduction method with CW 7 KHz.
Figure 12:
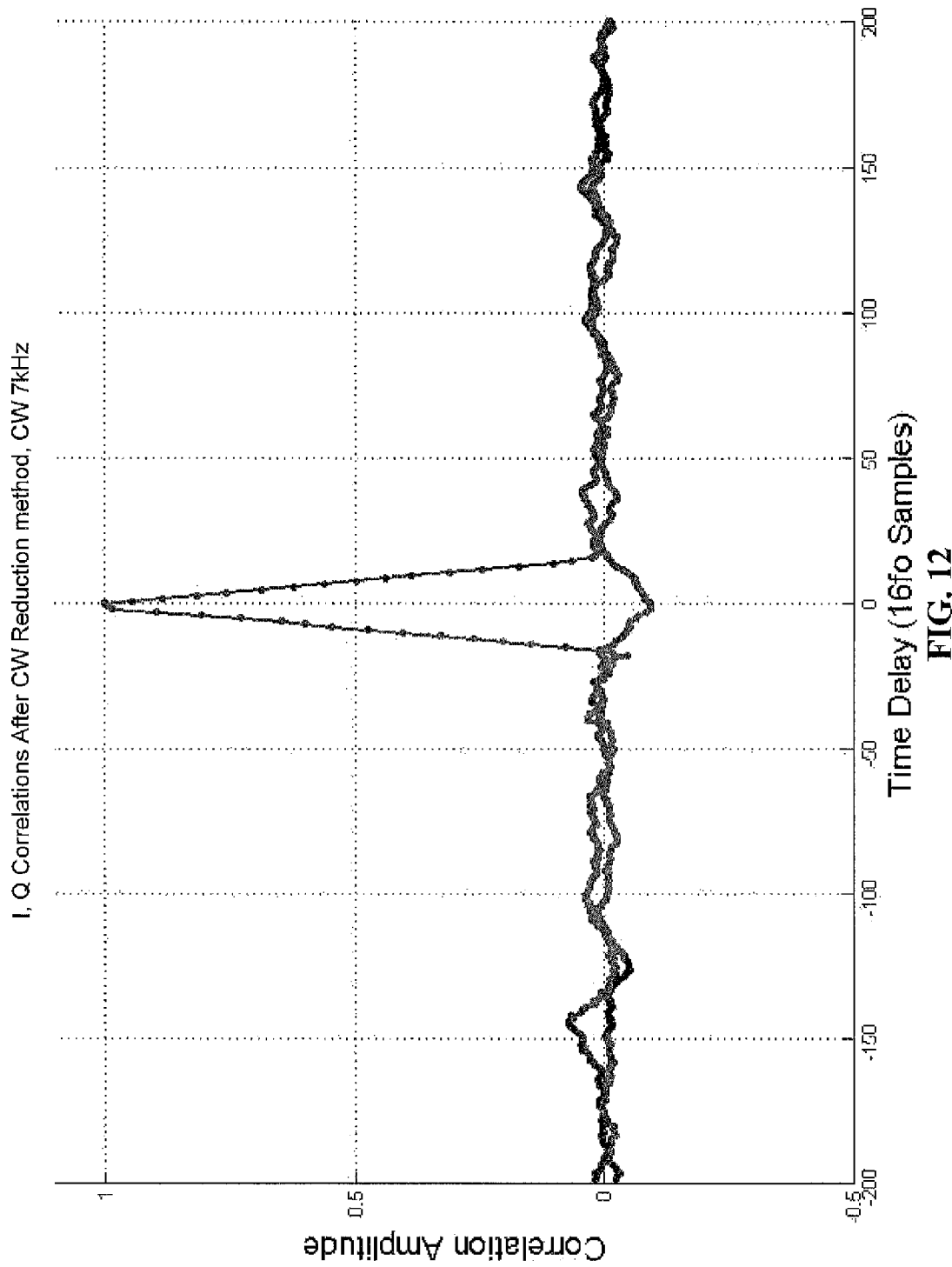
FIG. 12 is a plot showing I/Q correlations after processing under the CW estimation and reduction method with CW 7 KHz.

CW_present_flag=false. (Eq. 2);

where $C_{punctual}$ is the non-coherent integration of the 20 msec I, Q coherent integration output of the punctual tap from the GPS Tracking Channel Hardware. The non-coherent integration period K can be set to either 160 msec, 320 msec, 640 msec, 1.28 sec, 2.56 sec, or 5.12 sec, identical to the $NCS_{signal\ K}$ in ETA. Alternatively, K can be set to any multiple of 160 msec up to 5.12 sec to speed up the CW detect time. $C_{offset}$ is the mean of M offset correlations as shown in FIG. 6. Each of the $(C_1, C_2, \ldots, C_M)$ is the non-coherent integration across period K of the 20 msec I, Q coherent integration corresponding to the offset taps. A larger value of M results in improved performance, at the expense of more complexity. However, the improvement for larger M eventually diminishes because Eq. 2 noise becomes dominated by the $C_{punctual}$ term, such that even if noise on $C_{offset}$ were zero one would still see the noise on $C_{punctual}$. M values may range from 1 to several thousand.

In one embodiment, M=6 is chosen as the number of correlators in the computation of $C_{offset}$. $CW_{threshold}$ is the CW detection threshold set using the CNo from the ETA. The relationship between $CW_{threshold}$ and CNo is determined empirically through simulation for each K so as to maximize the probability of detection and minimize the probability of a false detection. From Eq. 2, when $C_{punctual}$ is less than the product of $CW_{threshold}$ and $C_{offset}$, the CW_present_flag is set to indicate CW detect. This will trigger the CW estimation and reduction module 310, FIG. 3, to mitigate the CW interference before sending the measurements for further processing that leads to a position determination.

The ETA has been described in terms of being able to estimate with a given $P_{false}$ and $P_{true}$ that the detected signal is $\geq$CNo. The CW detection essentially uses the ETA to decide if a decision can be made about CW interference being present or not. Therefore, there are two statistical processes that are combined in the CW interference detection process: the first is whether CW detection Eq. 2 should be performed (this decision is based on the ETM), and the second decision is to perform the CW detection (Eq. 2). The joint probability of these two processes must be taken into account when determining the ETA threshold and $CW_{threshold}$. The statistical impact of both processes together is computed via a simulation program of the processes in the presence of noise.

As shown in FIG. 3, the early termination module 302 and the CW detector 304 may be extended to cover the case where 100 msec coherent integration is available to detect CW interference under very low signal condition ($\leq$−160 dBm.). As in early termination module 302, the low signal ETA in the low signal early termination module 306 computes the ratio of the punctual signal power to the noise channel power. To compute the low signal $ETM_K$ for Eq. 1, the coherent integration I, Q is non-coherently integrated over multiples of the 100 msec coherent intervals. Thus, the non-coherent integration period K for $NCS_{signal\ K}$ and $NCS_{noise\ K}$ of Low Signal ETA can now be any multiple of 100 msec up to 5 sec. As in ETA for the 20 msec coherent integration, one strategy in estimating low signal CNo would be to start with the smallest K=100 msec and its decision threshold. If the measured $ETA_K$=100 msec exceeds the decision threshold, then the CNo can be estimated from the simulated K=100 msec curve showing the relationship between CNo to ETA. Otherwise, a new $ETA_K$ measurement should be taken with the next larger K. This process is repeated until either $ETA_K$ exceeds the new threshold for the larger K or K has reached the maximum of 5 sec.

The low signal early termination module 306 provides the CNo to the low signal CW detector 308 for it to set the CW detection threshold to test for the presence of CW under very low signal conditions. The low signal CW detector 308 operates almost the same way as the CW detector 304 for the 20 msec coherent integration described by Eq. 2. One difference is that the non-coherent integration period K may be any multiple of 100 msec up to 5 sec. Also, the number of M offset correlations used to compute $C_{offset}$ is also increased. In one embodiment, M is chosen to be 40 with the punctual tap appearing within 2 chips of the latest offset tap or $C_{40}$.

When CW interference is detected by the low signal CW detector module 308, the CW estimation and reduction module 310 is triggered. The CW estimation and reduction module 310 operates on either the 20 msec or the 100 msec I, Q coherent integration values from the GPS Tracking Channel Hardware when the CW interference is detected by the 20 msec CW detector module 304 or the low signal CW detector 308. The CW estimation and reduction module 310 estimates the phase, frequency, and amplitude of the CW interference in the correlation domain from the coherent integration of a window of code phase around the punctual code phase. For each code phase k that is offset by greater than 1 chip from the punctual code phase, the method will:

Estimate $CW$ phase: $\theta_k = a\tan^{-1}(Q_k/I_k)$ (Eq. 3);

Estimate $CW$ delta phase: $\Delta\theta = \theta_k \theta_{k-1}$ (Eq. 4); and

Estimate $CW$ amplitude: $A=\sqrt{(I_k^2+Q_k^2)}$ (Eq. 5).

From these estimates, the method will form an estimate of the CW phase, frequency and amplitude at the punctual and offset code phase:

$$I_{CW_k} = A\cos(\omega t + \theta_k)$$

$$Q_{CW_k} = A\sin(\omega t + \theta_k)$$ (Eq. 6).

The CW estimate will then be subtracted from the I, Q coherent integration and the resulting output passed for further processing of the signals. The CW is estimated at offset correlations, then subtracted from all other correlations, including subtracting from the energy near the punctual correlation. The amplitude and phase of the sine and cosine waveforms estimates of the CW are essentially averaged across all the offset taps (e.g., if 40 offset taps are used then the estimate gets better the larger the number of taps used). The frequency term (omega) is estimated as the average of all the $\Delta\theta$ terms (frequency equals delta phase divided by time, where time is the known time between samples).

The CW detection is updated once every non-coherent integration period K, which is a multiple of 160 msec or 100 msec in either of the two CW detector modules 304 or 308. As long as the CW is detected, the CW estimation and reduction module 310 will operate to mitigate the CW interference. The combination of the CW detect period ranging from 160 msec up to 5.12 sec and the extended 100 msec coherent integration period gives the method the capability to mitigate dynamic CW interference in a low signal operating environment.

FIGS. 7 through 12 show simulation results of the coherent integration before and after the CW estimation and reduction module is applied for different CW frequencies. The figures demonstrate that the approach is effective in mitigating CW even in low signal conditions.

Figure 13:
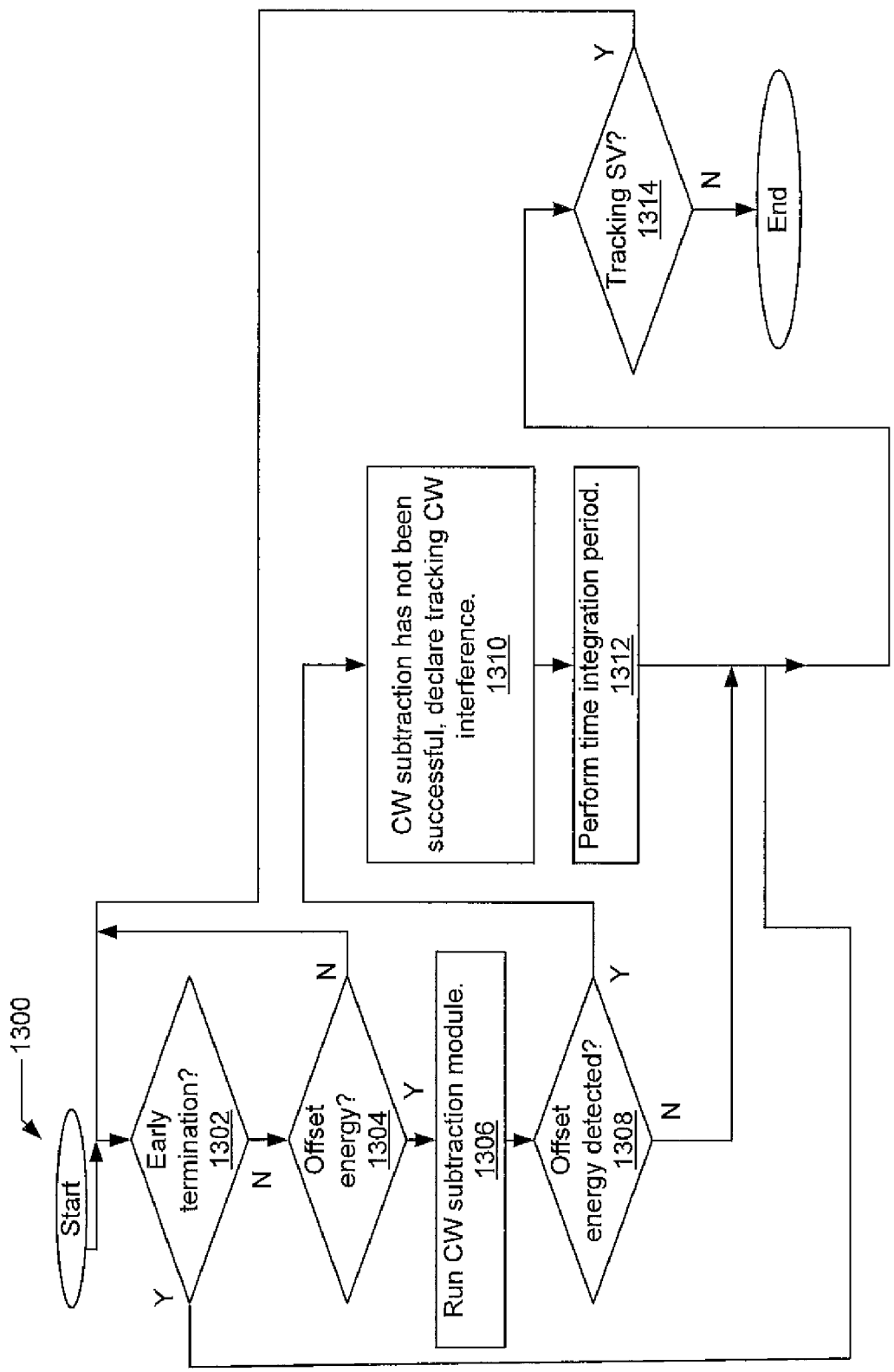
FIG. 13 is a flow diagram of the procedures performed by the CW subtraction module in an example implementation of the invention.

FIG. 13 is a flow diagram 1300 of the procedures performed by the CW subtraction module in an example implementation of the invention. The procedure starts by checking for early termination 1302. If there is not an early termination condition in step 1302, then a check is made for offset energy 1304. If offset energy is detected, then the CW subtraction module is run 1306; otherwise repeat the check for the next 160 msec period. After the CW subtraction has occurred in step 1306, the offset energy is once again checked 1308. If offset energy is detected 1308, then CW subtraction has not been successful and the CW interference is tracked.

On each time integration on the time integration period before the current time integration 1312. A determination is also made at to a SV being tracked 1314. If not tracked, processing is shown as ending. But in practice, a different procedure may be executed, rather than ending. If a SV is being tracked 1314, then early termination may once again be checked 1302. Similarly, if the offset energy detected step 130, does not detected offset energy then a determination occurs to identify if the GPS receiver is tracking SV 1314. The procedure is then repeated while the SV is being tracked.

Furthermore, the multiple process steps implemented with a programming language, which comprises an ordered listing of executable instructions for implementing logical functions, can be embodied in any machine-readable media for use by or in connection with an instruction execution system, apparatus, or device, such as a computer-based system, controller-containing system having a processor or controller, such as a microprocessor, digital signal processor, discrete logic circuit functioning as a controller, or other system that can fetch the instructions from the instruction execution system, apparatus, or device and execute the instructions.

While various embodiments of the invention have been described, it will be apparent to those of ordinary skill in the art that many more embodiments and implementations are possible within the scope of this invention. Moreover, it will be understood that the foregoing description of numerous implementations has been presented for purposes of illustration and description. It is not exhaustive and does not limit the claimed inventions to the precise forms disclosed. Modifications and variations are possible in light of the above description or may be acquired from practicing the invention. The claims and their equivalents define the scope of the invention. Accordingly, the invention is not to be restricted except in light of the attached claims and their equivalents.

What is claimed is:

1. A method for detecting and mitigating continuous wave (CW) interference in the correlation domain, the method comprising:
   receiving a radio frequency (RF) positioning signal at a GPS receiver;
   converting the RF positioning signal to a baseband signal;
   correlating the baseband signal with a plurality of codes to produce punctual correlation values and offset correlation values;
   coherently integrating the punctual correlation values;
   coherently integrating the offset correlation values;
   determining an ambient noise level;
   setting a threshold value to the determined ambient noise level;
   non-coherently integrating the coherently integrated punctual correlation values;
   non-coherently integrating the coherently integrated offset correlation values;
   detecting the CW interference based on the non-coherent integration values and the threshold; and
   subtracting the detected CW interference from the coherent integration values.

2. The method of claim 1, further including the step of estimating phase, frequency, and amplitude of the detected CW interference.

3. The method of claim 1, further including the step of estimating a minimum signal to noise power (CNo) ratio that results in a CW detection level being established that is employed when detecting the presence of CW interference.

4. The method of claim 3, further including the step of determining an estimated CNo as a ratio of the non-coherent integration of a 20 msec coherent integration for the punctual correlation values and the non-coherent integration of the 20 msec coherent integration for the offset correlation values.

5. The method of claim 3, where detecting the presence of CW interference further includes identifying the presence of CW interference when the non-coherent integration of a 20 msec coherent integration for the offset correlation values multiplied by the CW detection level derived from the estimated CNo exceeds the non-coherent integration of the 20 msec coherent integration for the punctual correlation values.

6. The method of claim 3, where detecting the presence of CW interference includes the steps of:
   detecting CW interference in low signal conditions down to −160 dBm, where 100 msec of the coherent integration is available; and
   determining the estimated CNo with a ratio of the non-coherent integration of the 100 msec coherent integration for the punctual correlation values and the non-coherent integration of the 100 msec coherent integration for the offset correlation values.

7. The method of claim 3, further including the steps of:
   detecting CW interference under low signal condition down to −160 dBm, where 100 msec coherent integration is available, and
   detecting CW interference that is identified when the non-coherent integration of the 100 msec coherent integration for the offset correlation values is multiplied by the CW detection level derived from an estimated CNo that exceeds the non-coherent integration of the 100 msec coherent integration for the punctual correlation values.

8. The method of claim 3, further including the step of estimating a phase, a frequency, and an amplitude of the CW interference in the correlation domain by operating on a 20 msec coherent integration of a window of offset correlation values around the punctual correlation values.

9. The method of claim 3, further including the step of estimating when the CW interference is detected under low signal conditions, a phase, a frequency, and an amplitude of the CW interference in the correlation domain by operating on a 100 msec coherent integration values of a window of the offset correlation values around the punctual correlation values.

10. The method of claim 4, further includes the steps of:
    setting a non-coherent integration period to a multiple of 160 msec up to 5.12 sec and non-coherent integrations: and
    performing non-coherent integrations by taking the square root of the sum of the square of a 20 msec coherent integration value.

11. The method of claim 7, further including the steps of:
    setting the non-coherent integration period to a multiple of 100 msec up to 5 sec; and
    performing the non-coherent integration by taking the square root of the sum of the square of the 100 msec coherent integration values in a low signal condition.

12. The method of claim 3, where estimating the minimum CNo further includes the steps of:
    identifying a smallest non-coherent integration period,
    establishing a minimum decision level for the selected non-coherent integration period;
    comparing a measured ratio of the non-coherent integration for the punctual correlation values and that for the offset correlation values to the minimum decision level;
    estimating the CNo from the simulation curve showing the relationship between the CNo and the measured ratio for the selected non-coherent integration period if the measured ratio exceeds the minimum decision level;
    increasing the non-coherent integration period if the measured ratio does not exceed the minimum decision level; and
    estimating the CNo from the simulation curve with a relationship between the CNo and the measured ratio for the longest non-coherent integration period if the measured ratio does not exceed the minimum decision level and the non-coherent integration period is already at the maximum integration period.

13. The method of claim 5, where both the 20 msec coherent integration for the punctual correlation values and that for the offset correlation values are aligned with a 50 bit per second boundary.

14. The method of claim 5, where the 20 msec coherent integration for the offset correlation values are not synchronized to any tracking channel.

15. The method of claim 5, further including the step of maintaining a global moving window non-coherent integration of a 160 msec period as the non-coherent integration of a last eight shared 20 msec coherent integrations for the offset correlation values.

16. The method of claim 6, further including the step of maintaining a local version of the 160 msec non-coherent integration for the offset correlation values by using a global value that best synchronizes with a track channel that is associated with a satellite vehicle.

17. The method of claim 6, where detecting CW interference further includes the step of determining a mean of the non-coherent integration period set to any multiple of 160 msec up to 5.12 sec.

18. The method of claim 6, further including the step of determining a mean of the non-coherent integration of a 20 msec coherent integration for a number of different adjacent offset correlation values.

19. The method of claim 8, where detecting CW interference includes the step of setting the non coherent integration period for the CW detect to any multiple of 100 msec up to 5 sec under low signal conditions.

20. The method of claim 9, where estimating the phase, frequency, and amplitude of the CW interference in the correlation domain for each code phase that is offset by greater than 1 chip from the punctual code phase, further includes the steps of:
    estimating the phase by taking an $atan^{-1}$ of the coherent integration divided by the coherent integration;
    estimating a delta phase by taking the difference between an estimated phase of a current offset code phase and that of an adjacent offset code phase; and
    estimating the amplitude by taking a square root of the sum of the square of the coherent integration.

* * * * *

UNITED STATES PATENT AND TRADEMARK OFFICE
CERTIFICATE OF CORRECTION

PATENT NO. : 8,184,676 B2  
APPLICATION NO. : 12/341584  
DATED : May 22, 2012  
INVENTOR(S) : Gary Lennen Page 1 of 1

It is certified that error appears in the above-identified patent and that said Letters Patent is hereby corrected as shown below:

Column 12, claim 18, line 32, after the word "different", please delete the word "adjacent".

Signed and Sealed this
Fourteenth Day of August, 2012

David J. Kappos
*Director of the United States Patent and Trademark Office*